Patented June 14, 1949

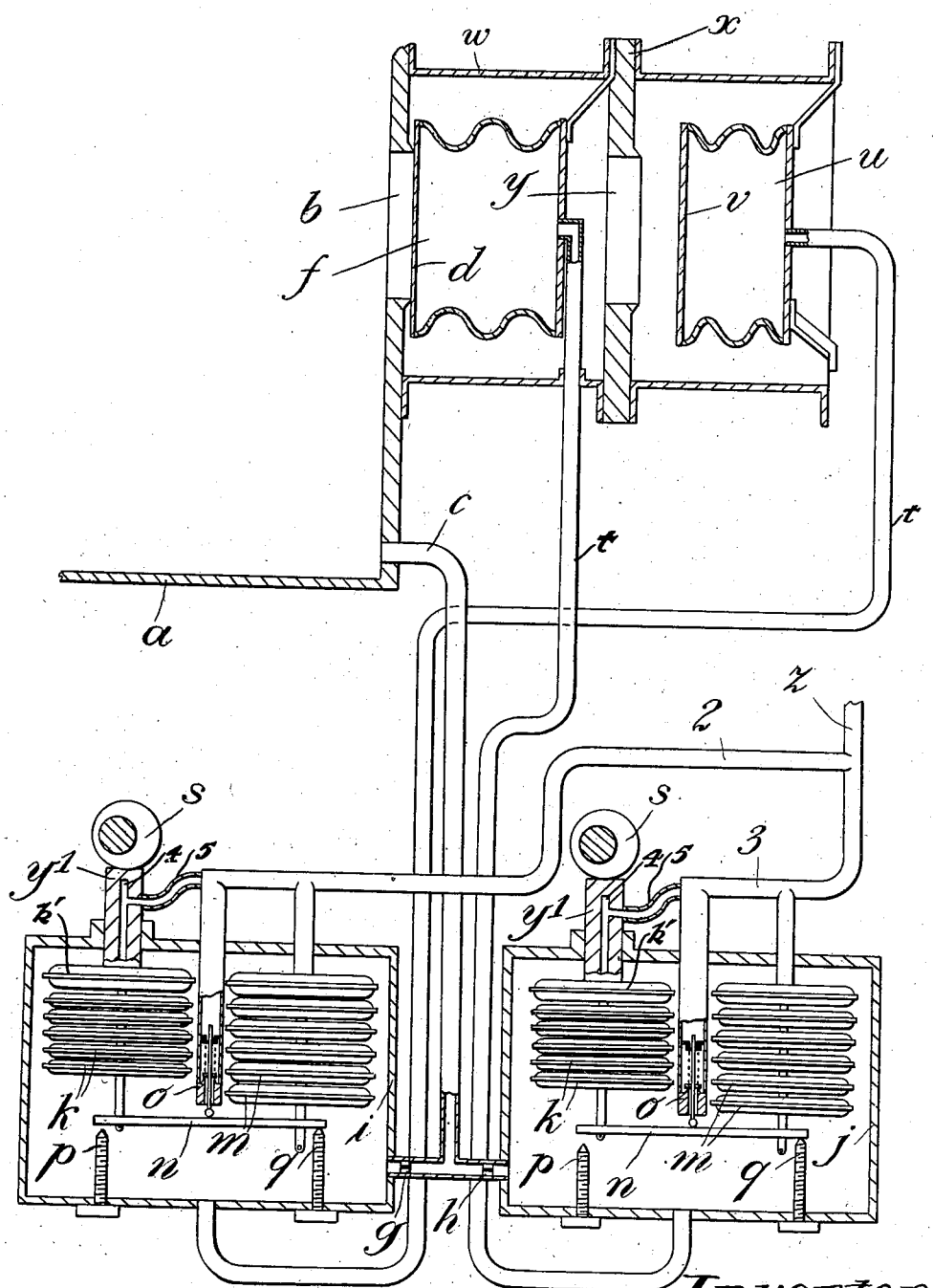

2,473,117

UNITED STATES PATENT OFFICE 2,473,117

SYSTEM FOR CONTROLLING THE PRESSURE IN THE CABIN OF AN AIRCRAFT OR THE LIKE

William Macey Widgery, Yeovil, England, assignor to Westland Aircraft Limited, Yeovil, England Application September 13, 1945, Serial No. 616,051
In Great Britain June 26, 1944

4 Claims. (Cl. 98—1.5)

This invention relates to systems for controlling the pressure in the cabin of an aircraft or the like within predetermined limits notwithstanding changes of external atmospheric pressure wherein a cabin pressure release valve is actuated by a control unit. With such systems danger, or at least inconvenience, to the occupants of the cabin may be incurred in the event of the cabin pressure release valve failing to close and thus allowing the pressure in the cabin to fall to that of the external atmospheric pressure.

The provision of the mere addition of a further cabin release valve and control unit would not avoid this difficulty, since if either valve should fail to shut, the cabin pressure would thus be allowed to fall.

The object of the present invention is to provide means whereby uncontrolled loss of cabin pressure, in the event of a cabin outlet release valve failing to close, is prevented.

The invention consists in pressure control systems for aircraft cabins or the like having features as set forth in the claims appendant hereto.

The accompanying diagrammatic drawing illustrates one convenient arrangement of pressure control system embodying the present invention.

In carrying the invention into effect according to the form illustrated by way of example as applied to an aircraft pressure cabin, I provide two outlets $bc$ from the cabin space $a$, the outlet $b$ being controlled by a valve $d$ mounted on the movable wall of a bellows $f$ whilst the outlet $c$ is connected by way of restricted openings $gh$ to the interiors of two separate containers $ij$. Within each container is disposed a set of absolute pressure sensitive control capsules $k$ and a set of differential pressure sensitive control capsules $m$ the movable members of which are associated with a beam $n$ the centre of which abuts the stem $o$ of a small air valve—conveniently a Schrader valve.

At the upper end of each set of A. P. S. C. capsules $k$ a single D. P. S. C. capsule $k'$ is provided; the capsules $k$ are entirely closed but the capsules $k'$ are connected to atmosphere by way of ducts 4 in the plungers $y'$ and pipes 2, 3, 5 and $z$. The purpose of the D. P. S. C. capsules $k'$ is to reduce the droop in the characteristic curve connecting true altitudes and apparent cabin altitudes whilst the capsules $k$ alone are in control.

Fixed stops $pq$ are provided beneath each beam and loose connections between the movable members of the capsules and the beam.

The ends of the differential pressure sensitive control capsules $m$ are rigidly attached to the containers whilst one end of each of the capsules $k'$ carries a plunger $y'$ passing through a gland in the wall of the container. The plungers $y'$ are furnished with internal ducts 4 connected by flexible pipes 5 open at $z$ to the outside air. A cam $s$ is provided adjacent to each plunger, the cams being so correlated that plungers may be adjusted in position axially by rotating the cams simultaneously.

The valve-carrying bellows $f$ is connected by a pipe $t$ to the container $j$ whilst a second bellows $u$ carrying a second valve $v$ is connected to the container $i$. The two valves $dv$ are disposed in cascade within a tubular member $w$ communicating at one end with the cabin outlet $b$ and communicating at the other end with the atmosphere; a partition $x$ having a central opening $y$ and valve seating for association with the valve $v$ is provided within the tubular member $w$.

The sets of differential pressure sensitive control capsules $m$ in each container and the outlet from the Schrader valve are in communication with the atmosphere by way of pipes $z2$ and $3$.

In operation, both cabin outlet valves $bv$ are operated in series by their control units so as to maintain cabin pressure at predetermined desired magnitudes at the various altitudes assumed by an aircraft, the performance of the control units being modified as desired in accordance with the setting of the cams $s$. The cams may be set to produce any desired clearance between the fixed stops $p$ and the ends of the beam $n$ adjacent to these stops, within limits, say of 0.01" to 0.06".

In one example with the clearances adjusted to 0.01" the pressure within the cabin will remain substantially constant at ground atmospheric pressure, notwithstanding increase of altitude of the aircraft to about 13,000 ft. at which point a differential pressure of about 5½ lbs. per square inch between the cabin pressure and external atmospheric pressure will obtain. Further increase in altitude will result in progressive fall of pressure within the cabin but maintenance of the said constant differential pressure.

With the clearances set to, say 0.06" the pressure in the cabin with increase in altitude would gradually decrease up to an altitude of about 4,000 ft. whereupon the cabin pressure will be maintained substantially constant with gradual development of differential pressure until an altitude of about 16,000 ft. is reached, the differential pressure then being about 5 lbs. per sq. in. From this altitude to an altitude of about 23,000 ft. the cabin pressure will gradually fall and the differential pressure will increase to, say 5½ lbs. per sq. in. From this point onwards with increase of altitude the cabin pressure will continue to fall with maintenance of constant differential pressure of 5½ lbs. per sq. in. If either of the pressure cabin outlet valves fails by remaining open, no undesirable results will accrue since the other valve completely controls the exit of air from the cabin, thus contributing considerably to safety and well being of the cabin occupants. Should either valve fail by remaining shut, then the situation may be covered by the provision of a non-return safety cabin outlet valve.

If desired more than two valves and control units arranged in series relationship may be employed.

Whilst in the example described above with reference to the accompanying drawings means are provided for adjusting the cabin pressure attained at various altitudes, it is to be understood that variable control means may be dispensed with, the cascade arrangement of pressure release valves being used with individual separate control units that are not afterwards modified during flight.

I claim:

1. A pressure control system for aircraft cabin spaces or the like embodying a pair of essentially similar cabin pressure release valves disposed in cascade relationship, pneumatic actuating means for opening and closing each of said valves, a control chamber for each of said pneumatic actuating means, pressure responsive bellows and a control valve for releasing cabin pressure to atmosphere in each of said control chambers and a connection between each control chamber and said space.

2. A pressure control system embodying a pair of closed chambers connected to an aircraft cabin space or the like, each chamber containing a set of absolute pressure sensitive control capsules, a set of differential pressure sensitive control capsules, a small valve for releasing cabin pressure to atmosphere and means operable by both sets of capsules for actuating said small valve, a pair of cabin pressure release valves disposed in cascade relationship, pneumatic actuating means for opening and closing each of said valves and a conduit between each of said pneumatic actuating means and said closed chambers.

3. A pressure control system as claimed in claim 2 wherein said absolute pressure sensitive control capsules are carried on axially movable mountings and a shaft is provided carrying two cams co-acting respectively with said mountings.

4. A pressure control system embodying a pair of cabin pressure release valves disposed in cascade relationship, pneumatic actuating means for opening and closing each of said valves, a pair of closed chambers, a conduit between each of said chambers and an aircraft cabin space or the like by way of a restricted opening and further conduits between said chambers and said pneumatic actuating means respectively, said chambers each containing a set of absolute pressure sensitive control capsules, a set of differential pressure sensitive control capsules, a small valve for releasing cabin pressure to atmosphere and means operable by both sets of capsules for actuating said small valve.

WILLIAM MACEY WIDGERY.

REFERENCES CITED

The following references are of record in the file of this patent:

UNITED STATES PATENTS

| Number | Name | Date |
|---|---|---|
| 1,733,575 | Broids | Oct. 29, 1929 |
| 2,316,416 | Gregg | Apr. 13, 1943 |
| 2,399,326 | Crot | Apr. 30, 1946 |
| 2,407,257 | Del Mar | Sept. 10, 1946 |
| 2,433,206 | Dube | Dec. 23, 1947 |